May 22, 1923.                                                                1,456,094
G. W. CHALMERS
CAN TESTING APPARATUS
Filed May 29, 1919                      4 Sheets-Sheet 1

Inventor
George W. Chalmers
Attorneys.

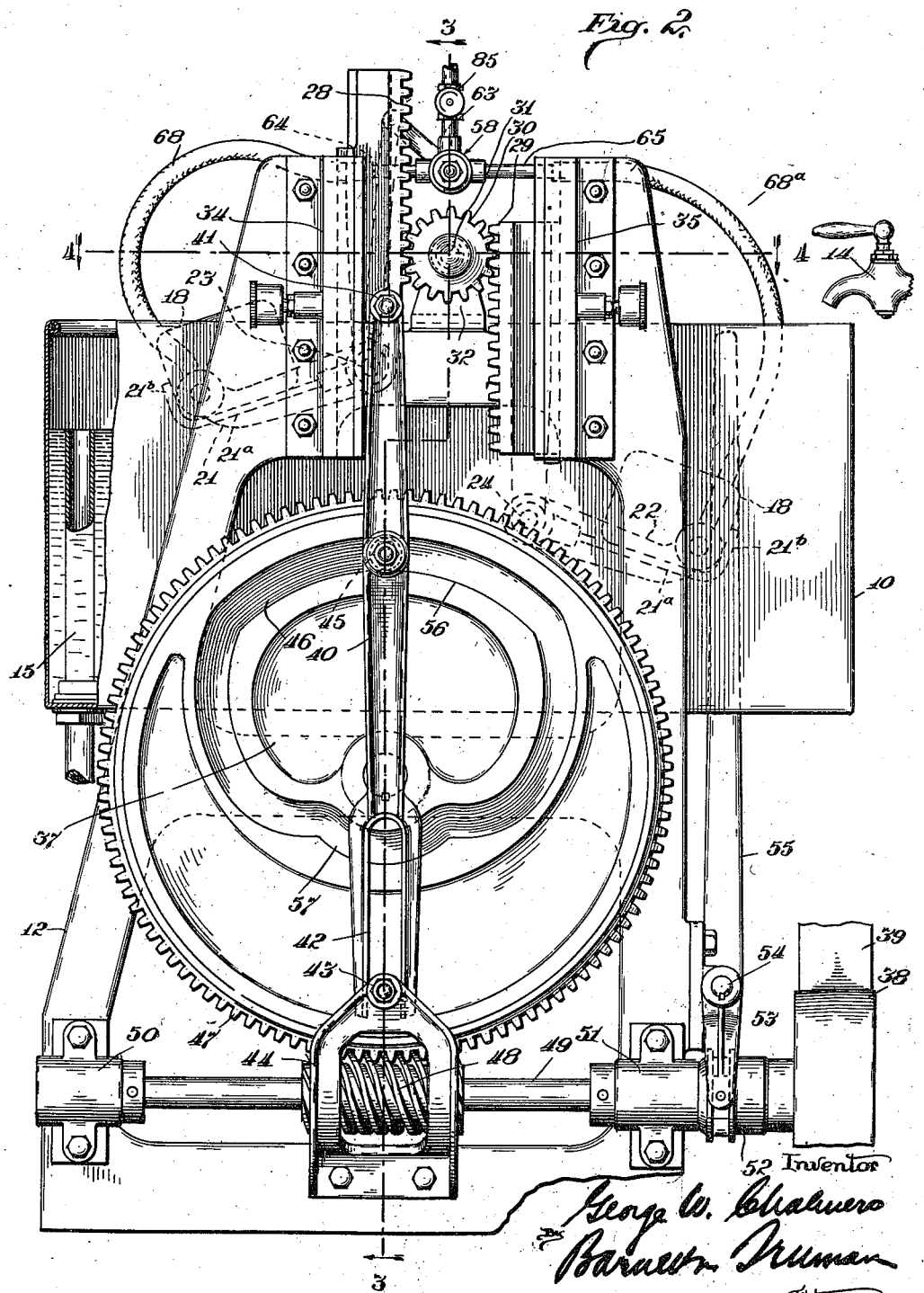

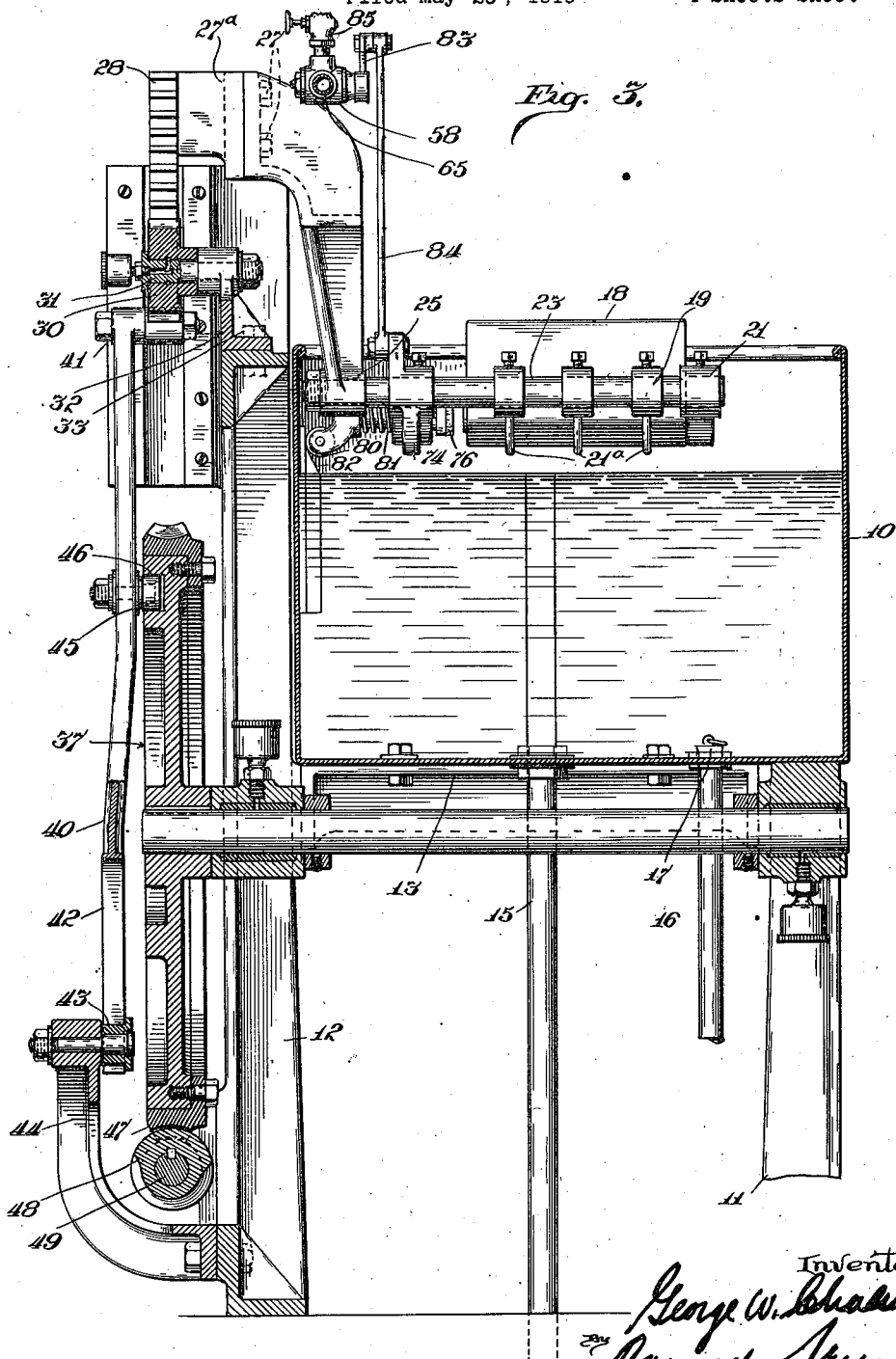

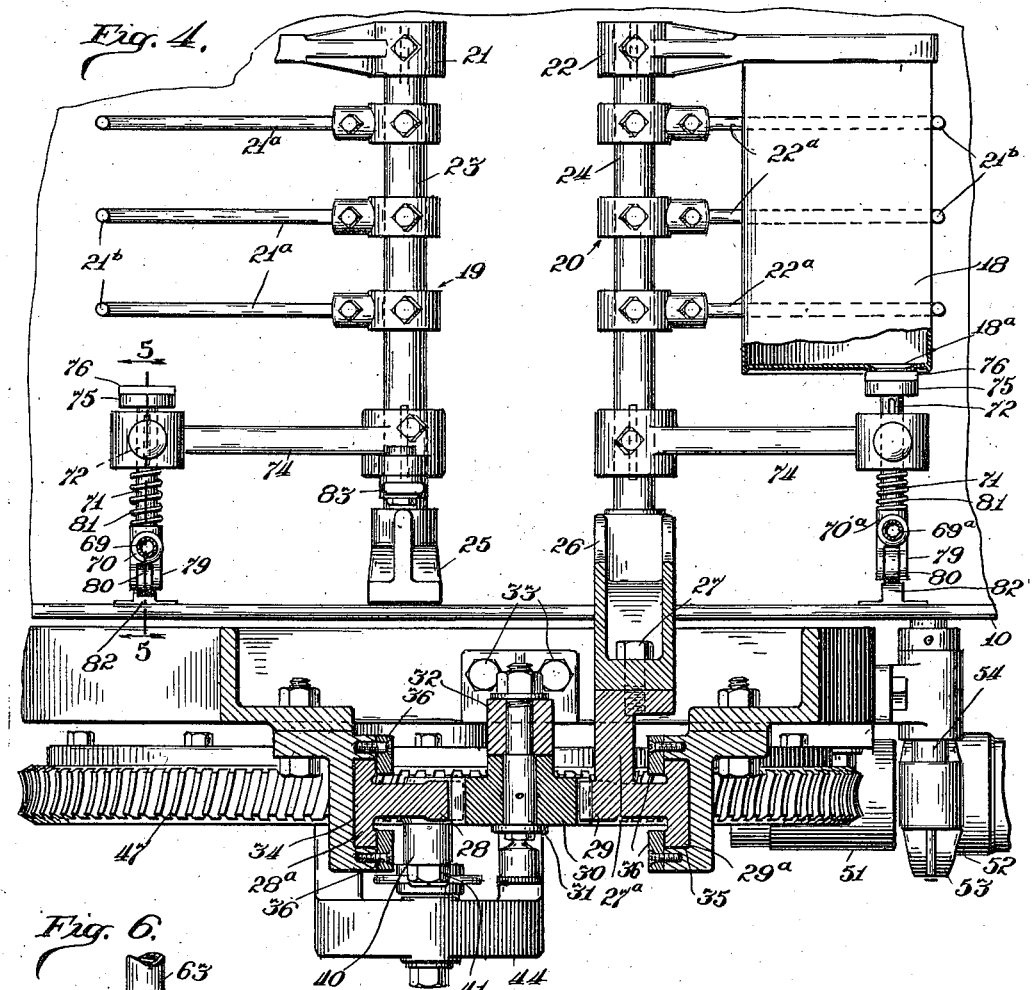
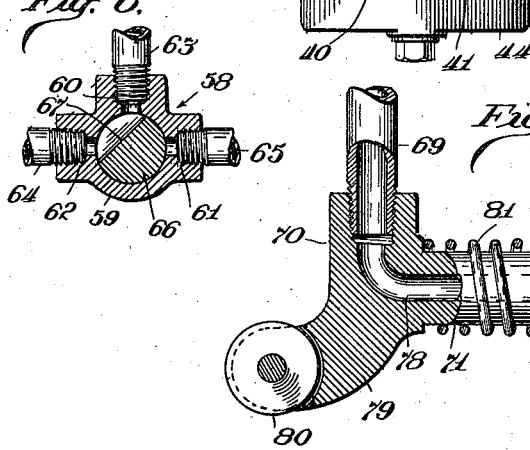
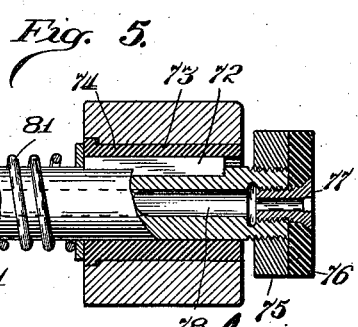

Patented May 22, 1923.

1,456,094

UNITED STATES PATENT OFFICE.

GEORGE W. CHALMERS, OF SUMMIT, ILLINOIS, ASSIGNOR TO CORN PRODUCTS REFINING COMPANY, OF NEW YORK, N. Y., A CORPORATION OF NEW JERSEY.

CAN-TESTING APPARATUS.

Application filed May 29, 1919. Serial No. 300,618.

*To all whom it may concern:*

Be it known that I, GEORGE W. CHALMERS, a citizen of the United States, residing at Summit, in the county of Cook and State of Illinois, have invented certain new and useful Improvements in Can-Testing Apparatus, of which the following is a specification.

My invention relates to can testing apparatus of the type in which the cans being tested are submerged in a tank of water and filled with air under pressure, so that leaks in the cans will be disclosed by the presence of bubbles in the water.

One of the objects of the invention is to provide an improved and conveniently operated apparatus of the above character which is so constructed that the operator may closely observe the condition of a submerged can and at the same time remove a previously tested can from the machine and apply another can in its place, so that the operation of the machine may be continuous and reliable results obtained.

One of the principal objections to the present types of can testing machines is that the submerging and emerging of the cans causes the water level to rise and fall, and otherwise keep the water in agitation whereby bubbles are formed, making it very difficult for the operator of the machine to detect the presence of small leaks in the cans being tested. My invention contemplates as one of its objects to overcome the above and other incidental objections to the various types of machines now in use by providing an apparatus having two reciprocating can racks movable simultaneously in opposite directions in such a manner that the can on one rack enters the water at the same time that the can on the other rack emerges therefrom, so that an intermittent displacement and the disturbance of the water is avoided and the surface of the water is kept relatively smooth and substantially free from bubbles.

The invention has for further objects, the novel arrangements, constructions and combinations of parts and devices hereinafter described and claimed for carrying out the above stated objects, and such other objects as may appear from the following description of a preferred embodiment of the invention.

In the drawings:

Fig. 2 is a view in elevation of the rear side of the apparatus;

Fig. 3 is a sectional view taken on line 3—3 of Fig. 2;

Fig. 4 is a sectional plan taken on line 4—4 of Fig. 2;

Fig. 5 is a vertical section of a valve element employed in my apparatus to close the opening of a can while it is being tested; and Fig. 6 is a cross-section of my preferred form of valve, the same being shown in the position which it assumes when the operating parts of the machine are in the position shown in Fig. 1.

Like characters of reference designate like parts in the several figures of the drawings.

Figure 1:
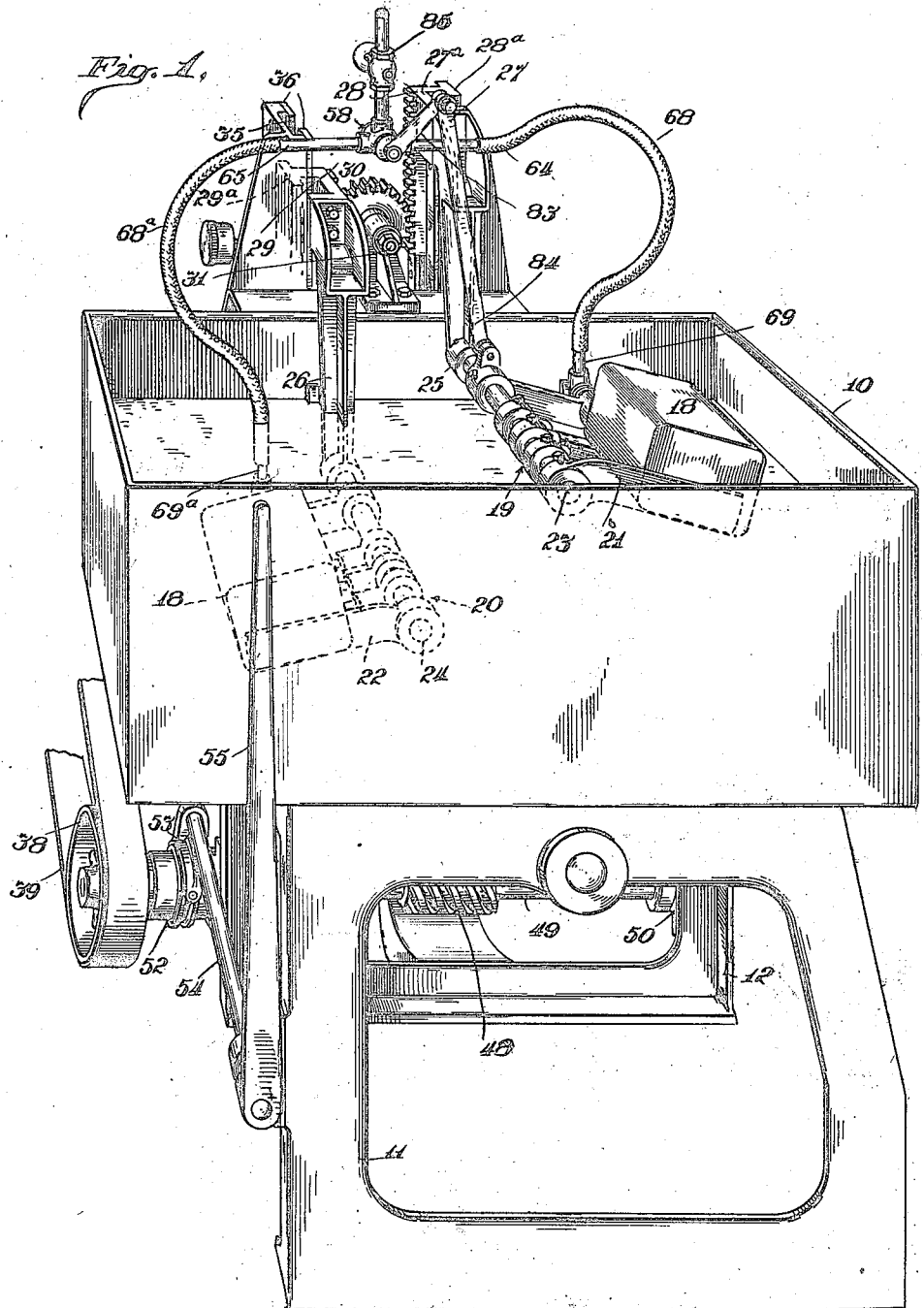
Fig. 1 is a view in perspective of a preferred embodiment of my invention.

The embodiment of the invention illustrated in the drawings consists of a tank 10 adapted to contain water or other suitable liquid and supported on a frame comprising a front support 11, rear support 12, and cross-strips 13. The water is supplied to the tank from a faucet 14 and is maintained at the desired level by means of an overflow pipe 15. The tank is also provided with a drain pipe 16 which is normally closed by a suitable plug 17.

The cans 18 are supported on vertically movable racks 19, 20, which are so positioned with relation to each other that the operation of the apparatus causes the can supported on one of the said racks to enter the water at the same time and at the same rate of speed as the previously tested can is raised out of the water. This arrangement and operation prevents the formation of the bubbles caused by the agitation or splashing action of the water against the side of the tank, such as is caused by intermittent displacement of the water due to one of the cans being entirely out of the water before the other one is submerged. It will also be perceived that the operation of my apparatus is such that it prevents the formation of bubbles, such as are usually caused by the swirling or circulation of the water (produced in other devices by passing the cans through the water in one general direction), and maintains a relatively smooth water level which assists the operator to readily detect small leaks in the submerged cans.

The can supporting racks 19, 20, consist of arms 21, 22, secured to the outer ends of rods 23, 24, which project laterally from the lower ends of downwardly extending brackets 25, 26, respectively, and can supporting arms 21$^a$, 22$^a$. The latter arms are bent upwardly at their outer ends to provide hook portions 21$^b$ (Figs. 2 and 4) which extend around the side of the can when it is on the rack. The said arms are adjustable radially and longitudinally of the rods 23, 24, so that the can supporting rack may be suitably adjusted for cans of various lengths and sizes. The brackets 25, 26 are secured, as indicated at 27, to lateral projecting lugs 27$^a$ at the upper end of toothed racks 28, 29, respectively. The toothed portions of these racks mesh with a gear 30 at diametrically opposite points so that the movement of one of said racks in one direction causes the other rack to move in the opposite direction. This operation produces the desired movement of the cans, as above referred to. The gear 30 is revolubly mounted on a stud 31 carried by a bracket 32 secured to the upper edge of the frame member 12, as indicated at 33. The toothed racks are vertically movable and are formed with integral slides 28$^a$, 29$^a$, which operate in guides 34, 35, suitably secured to the upper portion of the frame member 12. Metal strips 36 are attached to the vertical edges of the guides, so as to retain the slides 28$^a$, 29$^a$, in proper position. The vertical movement of the toothed racks 28, 29, is obtained by means of a cam 37 which cam rotated by a pulley 38 and belt 39. It will be obvious that if desired, the cam 37 may be suitably connected to an electric motor or any other source of motive power. The operative connection between the toothed racks 28, 29, and the cam 37 preferably consists of a vertically extending rod 40 which is suitably connected at its upper end to the lower end of the rack 28 as indicated at 41. The lower end of the rod 40 is formed with a bifurcated portion 42 which fits over a roller 43 carried by a bracket 44 secured to the lower portion of the frame 12. This arrangement supports the rod 40 in a substantially vertical position throughout the operation of the apparatus. A roller 45 is operatively secured to the inner face of the rod 40 and extends into the cam groove 46 so that the rotation of the cam will impart the desired vertical motion to the operating rod 40. The periphery of the cam 37 is provided with a worm gear 47 which is, preferably, removably secured to the cam, so that the cam and worm gear may be separately applied in the event of unequal wear of these parts. The worm gear 47 meshes with a worm 48 on a shaft 49. This shaft is journaled in bearings 50, 51, and is operatively connected to the pulley by means of a suitable clutch mechanism 52 which may be of any well known type. The clutch shown is operated by a fork 53 on a rock shaft 54 which carries a lever 55 for connecting and disconnecting the mechanism with the pulley 48. The operating lever 55 is arranged within convenient reach of the operator so that in the event of any uncertainty regarding the condition of a submerged can, the mechanism may be quickly and conveniently disconnected so that the can will remain submerged for any desired period. The operation of the apparatus is normally automatic, each can remaining submerged for a period corresponding to the dwell portions 56, 57 of the cam groove 46. However, in order to accurately determine whether or not a can has a very small leak, it is often desirable, as above mentioned, to keep the can submerged for a longer period than intended by the automatic operation of the machine.

When the cans are submerged in the water, they are automatically filled with air under pressure. This is preferably accomplished by mean of a valve 58 arranged above the water level so that any looseness in the operating parts of the valve, permitting the escape of air, will not make air bubbles in the water. This valve preferably consists of a casing 59 having three openings, 60, 61 and 62. A main air supply pipe 63 is screwed into the openings 61, 62, respectively, so as to direct the air to the cans carried by either of the supporting racks, as will be hereinafter described. 66 designates the valve body which is preferably formed with a slot 67 adapted when in one position to connect the air supply 63 with the branch pipe 64, and when in another position to cut off the said connection and establish a connection between the supply pipe and the branch pipe 65. The branch pipes 64, 65, are connected by means of flexible conduits 68, 68$^a$ with upstanding pipes 69, 69$^a$ carried by devices 70, 70$^a$, adapted to close the end opening 18$^a$ of the cans as they move downwardly toward the water. These devices each consist of a longitudinally movable element 71 (preferably made of brass so as not to corrode under the action of the water) which is splined as at 72 in a bushing 73 of similar material carried at the outer end of arms 74, 74$^a$ on the rods 23, 24, respectively. The outer end of the element 71 carries a resilient valve adapted to close the end opening of the can. This valve consists of a nut 75 threaded on the element 71 and a rubber gasket 76 supported against the face of the nut by means of a hollow screw 77 threaded into the air passage 78. The other end of the element 71 is formed with bifurcated portions 79 which support a roller 80. The valve devices 70, 70ª, are normally held in retracted position by means of a coiled spring 81. During the downward movement of the can supporting racks the rollers 80 engage cams 82 secured to the rear side wall of the tank 10 and cause the rubber gaskets 76 of the valves operated to be moved to close the opening 18ª in the ends of the cans before the latter are submerged. The arms 21, 22 and 74, 74ª, are positioned so that the maximum movement of the valve element 71 will clamp the cans in position with sufficient force to prevent them from floating and also prevent any leakage of air around the can openings. The positions of the cams 82 and their engagement with the rollers 80 are such that a direct outward force is exerted against the elements 71 and thereby avoiding the excessive strains present in the usual twisting cams employed to operate the end closure valves in other machines of this type. The air valve 66 is preferably operated automatically by means of a lever 83 connected to the arm 74 on the rack 19 by means of a connecting rod 84. A valve 85 is arranged in the air supply pipe above the valve 58 so that the air pressure may be reduced or entirely shut off from the apparatus, as desired.

I claim:

1. A can testing apparatus comprising a tank adapted to contain a quantity of water; can supporting devices adapted to alternately submerge cans in the water, means for operating said devices whereby one can enters the water at the time another emerges therefrom, and means for introducing air into said cans under pressure comprising a valve arranged so as to be constantly above the water level, and mechanism connecting said valve with the operating means of the can supporting devices whereby said valve is moved automatically to its open and closed positions.

2. A can testing apparatus comprising a tank adapted to contain a quantity of water, can supporting devices which reciprocate vertically in opposite directions and are adapted to alternately submerge cans in the water, means for operating said devices whereby one can enters the water at the time another emerges therefrom, and means for introducing air into said cans under pressure comprising a valve arranged so as to be constantly above the water level, and mechanism connecting said valve to one of said reciprocating devices whereby said valve is opened and closed at predetermined intervals.

3. In a can testing apparatus, the combination with a tank adapted to contain a quantity of water, of a plurality of can carrying devices adapted to reciprocate vertically to alternately submerge the cans in the water, means connecting said devices whereby movement of one of said devices in one direction imparts movement to another in the opposite direction, and operating mechanism for said can carrying devices adapted to hold a can in stationary position for a predetermined time while the can is submerged.

4. In a can testing apparatus, the combination with a tank adapted to contain a quantity of water, of a plurality of can carrying devices adapted to alternately submerge cans in the water, means connecting said devices whereby movement of one of said devices imparts relative movement to another, operating mechanism for said can carrying devices adapted to hold a can in a stationary position for a predetermined time while the same is submerged, driving means for said operating mechanism, and means for disconnecting said driving means and operating mechanism whereby the period of time in which the can is submerged may be prolonged.

5. In a can testing apparatus, the combination with a tank adapted to contain a quantity of water, of a plurality of can carrying devices adapted to alternately submerge cans in the water, means connecting said devices whereby movement of one of said devices imparts relative movement to another in the opposite direction, operating mechanism for said can carrying devices adapted to hold a can in a stationary position for a predetermined time while the same is submerged, driving means for said operating mechanism, and means operable at will to prolong the period of time during which the can is submerged.

6. In a can testing apparatus, the combination with a tank adapted to contain a quantity of water and having an overflow at a predetermined level, of can supporting devices which reciprocate in opposite directions and are adapted to alternately submerge cans in the water, said supporting devices being arranged with relation to the overflow level so that the submerging and emerging of the cans maintain a substantially uniform displacement of water and keep the water at a substantially constant level.

7. In a can testing apparatus, the combination with a tank adapted to contain a quantity of water, of can supporting devices adapted to alternately submerge cans in the water, means automatically operated to clamp the cans in position comprising movable mechanism carried by the can supporting devices, and means in the path of travel of said movable mechanism to force the same into clamping engagement with said cans, and means comprising a two-way valve arranged above the water level for introducing air into said cans.

8. In a can testing apparatus, the combination with a tank adapted to contain a quantity of water, of can supporting devices to move in opposite directions with relation to each other so as to alternately submerge cans in the water, means automatically operated to clamp the cans in position comprising closure valves to close the filling openings of the can, and means engaged by said closure valves during the downward movement of said can supporting devices to force the closure valves in clamping engagement with the cans, and means for introducing air into said cans comprising a two-way valve, and flexible elements providing ducts for directing the air from said valve to the can being tested.

9. In a can testing apparatus, the combination with a tank adapted to contain a quantity of water, of can supporting devices adapted to alternately submerge cans in the water, means movable to clamp the cans in position comprising closure valves carried by said can supporting devices to close the filling openings of the cans, means engaged by said closure valves to force said closure valves into clamping engagement with the cans, means for introducing air into said cans comprising a two-way valve having operating mechanism connected with one of said can supporting devices so as to be operated by the movement of the same, and flexible elements connecting said two-way valve and said end closure valves to provide ducts for directing the air from said valve to the cans when submerged.

10. In a can testing apparatus, the combination with a tank adapted to contain a quantity of water, of can supporting devices adapted to alternately submerge cans in the water, reciprocating closure valves adapted to close the end openings of the cans and clamp the cans to said supporting devices, means for normally holding said closure valves in retracted position, cams engaged by the closure valves during the downward movements of the can supporting devices to move said valves into closing position, and means for introducing air into the cans when submerged comprising a two-way valve arranged in a fixed position out of contact with the water.

11. In can testing apparatus, the combination with a tank adapted to contain water, of a pair of reciprocating can supporting devices and mechanism for moving one of said supporting devices alternately into and out of the water in the tank and for simultaneously moving the other supporting device in opposite directions, respectively, with the cans so positioned that the increasing displacement of water by the can entering the body of water is compensated by the decreasing displacement of water by the can emerging therefrom and the water level in the tank maintained substantially constant.

12. In can testing apparatus, the combination with a tank adapted to contain water, of a pair of reciprocating can supporting devices and mechanism for moving one of said supporting devices alternately into and out of the water in the tank and for simultaneously moving the other supporting device in opposite directions, respectively, to submerge the can on one of said supporting devices and then the can on the other supporting device, which mechanism operates to hold the submerged cans stationary for appreciable periods.

13. In can testing apparatus, the combination with a tank adapted to contain water, of a pair of reciprocating can supporting devices and mechanism for moving one of said supporting devices alternately into and out of the water in the tank and for simultaneously moving the other supporting device in opposite directions, respectively, to submerge the can on one of said supporting devices and then the can on the other supporting device, and means actuated by the aforesaid mechanism for clamping the cans to the supporting device and closing the filling openings thereof before the cans are submerged.

14. In can testing apparatus, the combination with a tank adapted to contain water, of a pair of reciprocating can supporting devices, mechanism for moving one of said supporting devices alternately into and out of the water in the tank and for simultaneously moving the other supporting device in opposite directions, respectively, to submerge the can on one of said supporting devices and then the can on the other supporting device, means actuated by the aforesaid mechanism for clamping the cans to the supporting device and closing the filling openings thereof before the cans are submerged, and means actuated by said mechanism for admitting air under pressure to said cans.

15. In can testing apparatus, the combination with a tank adapted to contain water, of a pair of racks and an intermeshing gear arranged at one side of the tank so that when one rack is raised the other is lowered, can supporting devices attached to said racks, respectively, and projecting into the tank, and means for imparting reciprocating movements to said racks.

16. In can testing apparatus, the combination with a tank adapted to contain water, of a pair of racks and an intermeshing gear arranged at one side of the tank so that when one rack is raised the other is lowered, can supporting devices attached to said racks, respectively, and projecting into the tank, means for imparting reciprocating movements to said racks, plungers on said racks for clamping the cans thereto and closing their filling openings, and cams in said tank for operating said plungers.

17. In can testing apparatus, the combination with a tank adapted to contain water, of a pair of racks and an intermeshing gear arranged at one side of the tank so that when one rack is raised the other is lowered, can supporting devices attached to said racks, respectively, and projecting into the tank, means for imparting reciprocating movements to said racks, an air supply pipe having flexible branches adapted to communicate with the cans on said racks, respectively, and mechanism operated when movements are imparted to the racks for directing air through said branch pipes alternately.

18. In can testing apparatus, the combination with a tank adapted to contain water, of a pair of racks and an intermeshing gear arranged at one side of the tank so that when one rack is raised the other is lowered, can supporting devices attached to said racks, respectively, and projecting into the tank, means for imparting reciprocating movements to said racks, plungers on said racks for clamping the cans thereto and closing their filling openings, cams in said tank for operating said plungers, an air supply pipe having flexible branches adapted to communicate with the cans on said racks, respectively, and mechanism operated when movements are imparted to the racks for directing air through said branch pipes alternately.

19. In can testing apparatus, the combination with a tank adapted to contain water, of a pair of racks and an intermeshing gear arranged at one side of the tank so that when one rack is raised the other is lowered, can supporting devices attached to said racks, respectively, and projecting into the tank, and mechanism comprising a cam on the side of said tank for imparting reciprocating movements to the racks.

20. In can testing apparatus, the combination with a tank adapted to contain water, of a pair of racks and an intermeshing gear arranged at one side of the tank so that when one rack is raised the other is lowered, can supporting devices attached to said racks, respectively, and projecting into the tank, and mechanism comprising a cam on the side of said tank for imparting reciprocating movements to the racks, said cam being shaped so as to momentarily arrest the movement of the racks while one of the cans is submerged.

GEORGE W. CHALMERS.